United States Patent [19]
Iba

[11] Patent Number: 5,627,679
[45] Date of Patent: May 6, 1997

[54] OPTICAL SYSTEMS MAKING USE OF PHASE TYPE FRESNEL ZONE PLATES

[75] Inventor: Yoichi Iba, Tokyo, Japan

[73] Assignee: Olympus Optical Co., Ltd., Tokyo, Japan

[21] Appl. No.: 896,450

[22] Filed: Jun. 10, 1992

[30] Foreign Application Priority Data

Jun. 10, 1991 [JP] Japan .................................. 3-137897

[51] Int. Cl.$^6$ ............................. G02B 27/44; G02B 5/18
[52] U.S. Cl. ................................. 359/565; 359/575
[58] Field of Search ........................... 359/565, 575, 359/566, 569, 573

[56] References Cited

U.S. PATENT DOCUMENTS

| | | | |
|---|---|---|---|
| 4,637,697 | 1/1987 | Freeman . | |
| 4,936,665 | 6/1990 | Whitney | 359/565 |
| 4,995,715 | 2/1991 | Cohen | 359/565 |
| 5,091,798 | 2/1992 | Hibino | 359/565 |
| 5,100,226 | 3/1992 | Freeman . | |
| 5,120,120 | 6/1992 | Cohen . | |
| 5,121,980 | 6/1992 | Cohen . | |
| 5,132,843 | 7/1992 | Aoyama et al. | 359/575 |
| 5,151,823 | 9/1992 | Chen | 359/565 |
| 5,161,057 | 11/1992 | Johnson | 359/565 |
| 5,229,797 | 7/1993 | Futhey et al. . | |
| 5,467,166 | 11/1995 | Shiraishi . | |

FOREIGN PATENT DOCUMENTS 63-85501  4/1988  Japan .

OTHER PUBLICATIONS

Swanson Binary Optics Technology:The Theory Design of Multilevel Diffractive Optical Elements, MIT Lincoln Labratory, Technical Report 854, 14 Aug. 1989.
Sweatt, Mathematical equivalence between a holographic optical element and an ultra–high index lens, J. Opt. Soc. Am., vol. 69, No. 3, Mar. 1979, pp. 486–487.
Optica Acta, 1984, vol. 31, No. 4, pp. 403–413, M.J. Simpson & A.G. Michette, "Imaging Properties of Modified Fresnal Zone Plates".
Journal of the Optical Society of America, 1961, vol. 51, No. 1 pp. 17–20, Kenro Miyamoto, "The Phase Fresnal Lens".

Primary Examiner—Georgia Y. Epps
Assistant Examiner—Ricky Mack
Attorney, Agent, or Firm—Cushman, Darby & Cushman IP Group of Pillsbury Madison & Sutro LLP

[57] ABSTRACT

The optical system of the invention includes a phase type Fresnel zone plate 5. The zone plate 5 includes thereon a central zone C located around the optical axis, through which light flux 2 emanating from an object and having a relatively small divergence angle passes, and a peripheral zone P located on the outside thereof. The central and peripheral zones C and P have given Fresnel pitches and blazing angles, so that the peripheral zone P can make use of diffraction higher in order than that used by the central zone C to obtain the desired refractive power. Although the minimum pitch of the phase type Fresnel plate zone is thus relatively larger in the peripheral zone P, the optical system is not only satisfactory in terms of the effect on correction of chromatic aberration and refractive power but ensures a good image surface contrast as well.

13 Claims, 3 Drawing Sheets

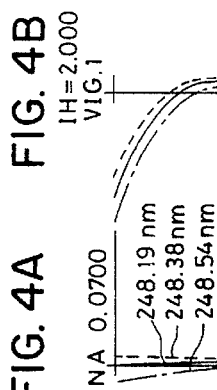
FIG. 5
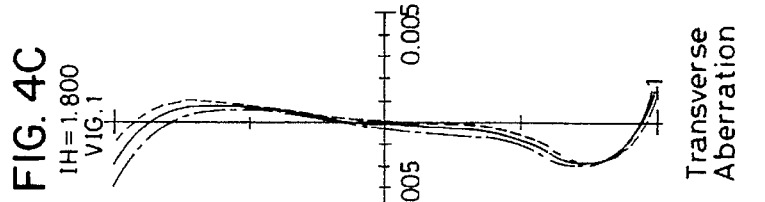
FIG. 4E
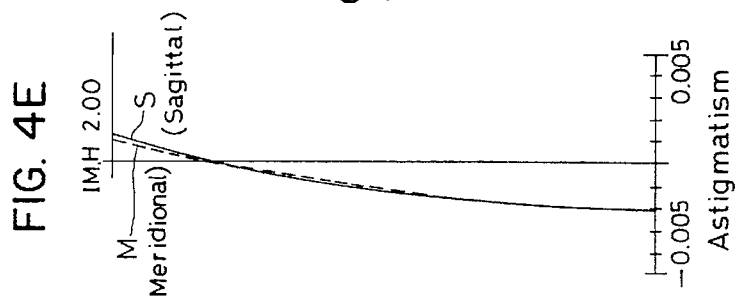
FIG. 4A  FIG. 4B  FIG. 4C  FIG. 4D
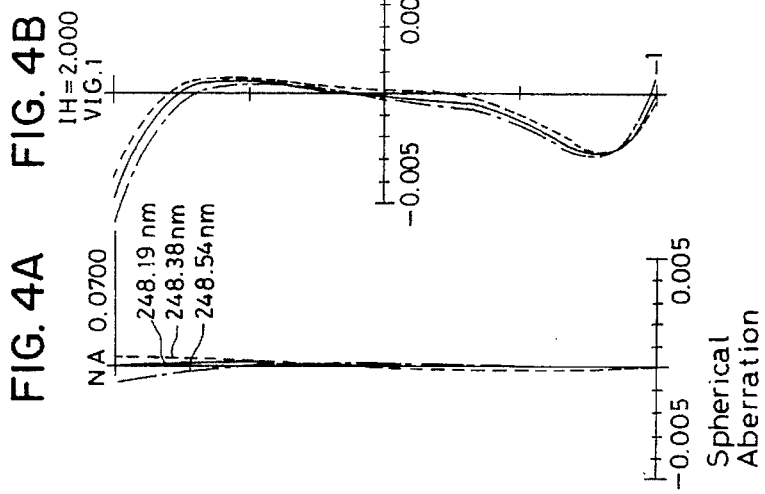

OPTICAL SYSTEMS MAKING USE OF PHASE TYPE FRESNEL ZONE PLATES

BACKGROUND OF THE INVENTION

The present invention relates generally to an optical system with a phase type Fresnel zone plate incorporated in it, and more particularly, to an optical system making use of a phase type Fresnel zone plate having so improved a structure that it can work better and be made more easily than ever before.

Heretofore, the vitreous material available for projecting lenses with demagnification incorporated in stepping projection aligners using KrF excimer laser as light sources has been substantially limited to quartz glass alone. This has rendered it unfeasible to correct chromatic aberration by the combined use of vitreous materials differing in dispersion. Thus, methods of using phase type Fresnel zone plates to correct chromatic aberration have been proposed in the art.

The principle of refraction of a ray by a phase type Fresnel zone plate—it is here noted that although the term "refraction" should be described in terms of diffraction or bending, it will be used elsewhere in the present disclosure, unless otherwise stated, because the phase type Fresnel zone plate hereinafter referred to may be deemed as a convergent or divergent optical element equivalent to a refracting lens—is the same as that of diffraction of a ray by a diffraction grating, and the angles θ and θ' of the ray incident on and leaving the normal of the phase type Fresnel zone plate may be expressed by the Fresnel pitch p (the distance between adjacent zonal areas) corresponding to the grating pitch of the diffraction grating and the wavelength λ of the ray, i.e., $$\sin\theta' - \sin\theta = m\lambda/p. \tag{1}$$

Here, m stands for the order of diffraction say, 0, ±1, ±2, ±3, ±4, ...

Equation (1) teaches that the amount of refraction of a ray increases with a wavelength increase. To put it another way, this indicates that the refractive power (the reciprocal of the focal length) of a phase type Fresnel zone plate increases with a wavelength increase. Since generally available optical glass materials inclusive of quartz glass have positive dispersion, on the other hand, lenses made up of such optical glass materials decrease in their refracting powers with wavelength increases. In other words; the phase type Fresnel zone plate has a lens action, but that lens action is apparently tantamount to that of a lens made up of an optical material having negative dispersion. If materials differing in dispersion are used, then chromatic aberration may be compensated for. For instance, Japanese Provisional Patent Publication No. Hei. 2-1109 (corresponding to U.S. Pat. No. 4,936,665) sets forth a technique, according to which a phase type Fresnel zone plate is placed at the pupil location of a projecting lens with demagnification incorporated in a stepping projection aligner using KrF excimer laser as a light source, thereby correcting chromatic aberration. The phase type Fresnel zone plate disclosed therein has a positive refractive power making use of a single order of diffraction. The use of a single order of diffraction makes it difficult to achieve high diffraction efficiency by diffraction of higher order. Low diffraction efficiency gives rise to harmful rays other than the light subject to the desired refraction, which are otherwise responsible for low image surface contrasts. Thus, there is no choice but to make use of diffracted light of low order, say, first or second order.

In this connection, it is noted that since the ability of a phase type Fresnel zone plate to correct chromatic aberration is determined by its refractive power, it must have a given refractive power so as to correct chromatic aberration well enough. On the other hand, the pitch of the phase type Fresnel zone plate decreases gradually from the optical axis in the radial direction, but the more the refractive power, the smaller the minimum Fresnel pitch, as will be understood from Equation (1). This makes plate production difficult. To correct chromatic aberration well enough, the minimum Fresnel pitch must be as fine as 5 μm or below. This makes plate production all the more difficult.

SUMMARY OF THE INVENTION

In view of such problems as mentioned above, an object of this invention is to provide an optical system making use of a phase type Fresnel zone plate which, although relatively large in the minimum Fresnel pitch, ensures that the effect on correction of chromatic aberration, refractive power and image surface contrast are all satisfactory.

According to the present invention, this object is achieved by providing an optical system in which a phase type Fresnel zone plate is incorporated and which is used for the projection of an object image, characterized in that:

the Fresnel pattern surface of the phase type Fresnel zone plate has a zonal area located at a region through which only light flux of first and higher order diffracted by an object passes, and the zonal area and a zone surrounding the optical axis and located on the inside thereof have given Fresnel pitches, so that the zonal area can make use of diffraction higher in order than that used by the inside zone to obtain the desired refractive power.

The present invention also provides a phase type Fresnel zone plate characterized in that the Fresnel pattern is divided into a circular central area including the optical axis which surrouds the optical axis and at least one zonal area to surround the disc zone in concentrical relation thereto, the outer zone having a given Fresnel pitch with respect to a plurality of areas including the central area and the at least one zonal area, so that the outer zone can make use of diffraction higher in order than that used by the inner zone to obtain the desired refractive power and high diffraction efficiency.

One embodiment of the present optical system with a built-in phase type Fresnel zone plate will now be explained more specifically with reference to FIG. 1. In FIG. 1, reference numeral 1 represents an object, and 2 and 3 each stand for light flux emitted by the object 1. The light flux 2 is a zero-order diffracted portion of the light flux diffracted by the object 1, while the light flux 3 is diffracted portions of first and higher order of the light flux, which lie on the outside of the light flux 2. Reference numeral 4 denotes a projection lens including a phase type Fresnel zone plate 5 at its pupil position and adapted to project an image of the object 1 on an image surface 9. Numeral 8 is a stop located adjacent to the phase type Fresnel zone plate 5 and adapted to serve to limit the light flux.

Combined with the optical subsystems located in front and in rear, the phase type Fresnel zone plate 5 serves to keep the overall aberrations of the projection lens 4 in a well-balanced state. A Fresnel pattern surface 7 of the phase type Fresnel zone plate 5 is divided into two zones, one an annular peripheral area called zone P through which only light flux of first and higher order diffracted by the object passes and the other a central zone C which lies inside the annular area defined by peripheral zone P and surrounds the optical axis. As a matter of course, all the zero-order diffracted light flux passes through the central zone C.

Based on this invention, the central zone C of the phase type Fresnel zone plate 5 is allowed to play a lens role making use of diffraction of relatively low order, while the peripheral zone P is permitted to play a lens role making use of diffraction of relatively high-order. Now letting m1 and m2 denote the orders of diffraction made available by the zones C and P, respectively, then the peripheral pitch of the zone P—where a conventional Fresnel pitch poses a problem because of being made fine—is increased to m2/m1-fold. If m1=1 and m2=2, then the pitch of the zone P is twice as large as that of a conventional phase type Fresnel zone plate designed to use the same order of diffraction all over the surface. If m2=3, then the peripheral pitch of the zone P trebles, thus making the production of the phase type Fresnel zone plate 5 much easier than ever before.

However, since the peripheral zone P is allowed to play a lens role by making use of diffraction of high order, it is usually difficult to make its diffraction efficiency as good as that of the central zone C; that is, the peripheral zone P is inferior in diffraction efficiency to the central zone C. Now letting K denote diffraction efficiency, then light expressed by (the energy of light flux passing through the peripheral zone P)×(1−K)   (2)

gives rise to a flare; in other words, it may be harmful in a sense of degrading the contrast of the image on the image surface 9. However, the energy of the light flux 3 passing through the peripheral zone P is much lower than that of the light flux 2. That is, since the zero-order diffracted light is by far larger in energy than diffracted light of other orders, the energy of the light flux 3 passing through the peripheral zone P, which is quite free from the zero-order diffracted light, is by far smaller than that of the light flux 2 including all the zero-order diffracted light. Thus, the energy of the harmful light conforming to Equation (2) is substantially negligible and so is unlikely to degrade the image contrast.

To increase diffraction efficiency, as a matter course, it is preferred that the Fresnel patterns on both the zones C and P be blazed. Also, the phase type Fresnel zone plate 5 may be positioned at a location different from the pupil location of the lens system as well. In this case, since the region through the light flux 2 passes is larger in area ratio than that through, the light flux 3 passes, the peripheral zone P is compressed relatively with respect to the central zone C. In other words, there is a decrease in the area ratio of the peripheral zone P which is easy to make. Consequently, it is preferred that the phase type Fresnel zone plate 5 be positioned in the vicinity of the pupil location of the lens system, but it is not necessarily placed at the pupil location.

It is understood that the phase type Fresnel zone plate 5 may be divided into three or more zones in the radial direction with respect to the optical axis. In this arrangement, the zone adjacent to the central zone is allowed to play a lens role by making use of diffraction higher order than that used by the latter, and an outer zone is permitted to play a lens role by making use of diffraction higher in order than that used by the inside zone.

Still other objects and advantages of the invention will in part be obvious and will in part be apparent from the specification.

The invention accordingly comprises the features of construction, combinations of elements, and arrangement of parts which will be exemplified in the construction hereinafter set forth, aria the scope of the invention will be indicated in the claims.

BRIEF DESCRIPTION OF THE DRAWINGS

The invention will now be explained more specifically but not exclusively with reference to the accompanying drawings, in which:

FIGS. 4A–4E are aberration diagrams of a projection lens with demagnification built in the optical system.

FIG. 5 illustrates an enlarged schematic drawing of a Fresnel zone plate as used in the claimed optical systems.

DESCRIPTION OF THE PREFERRED EMBODIMENTS

Figure 1:
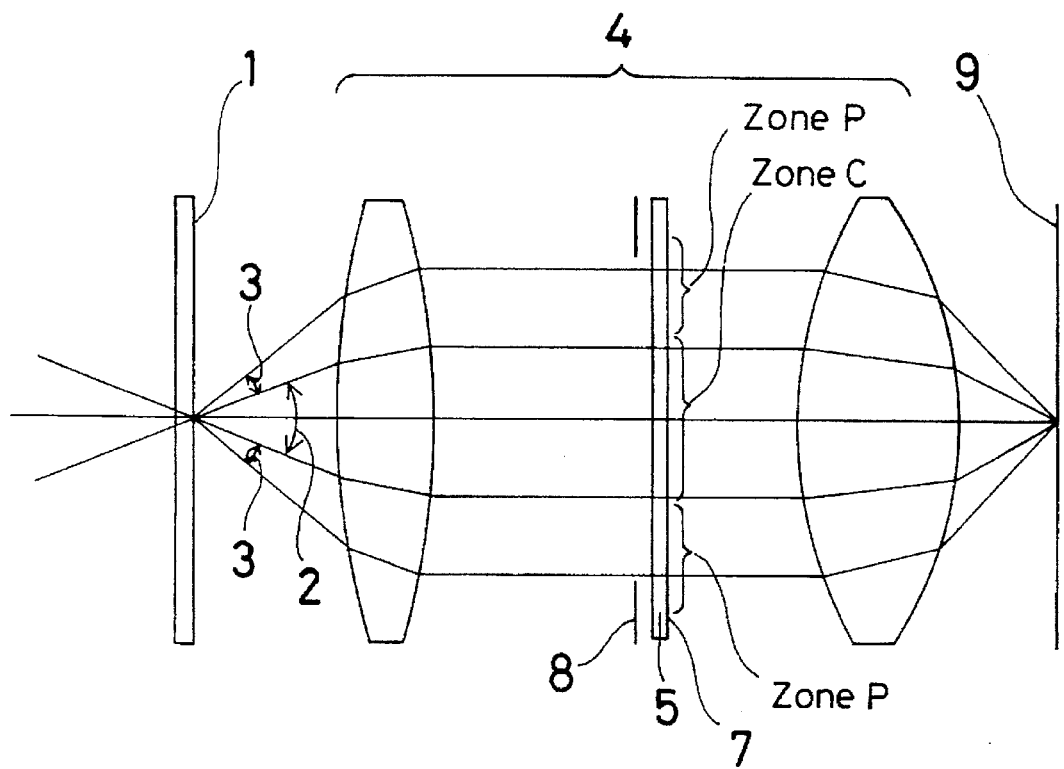
FIG. 1 is a view provided for illustrating the construction and action of the phase type Fresnel zone plate according to the invention.
Figure 2:
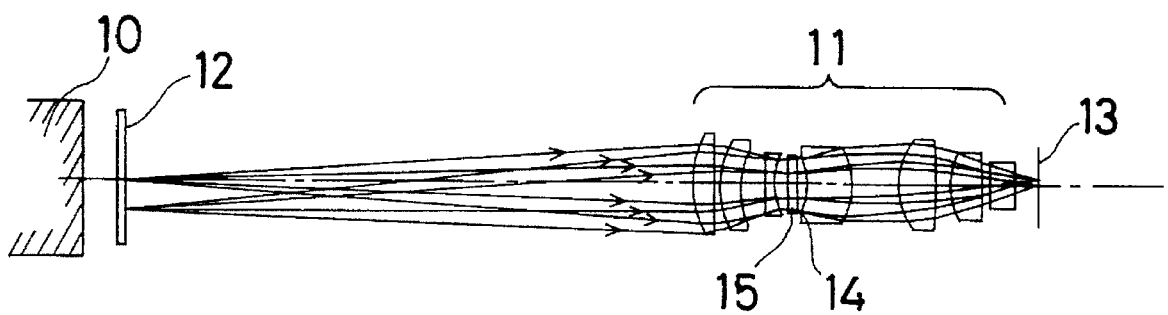
FIG. 2 is a sectional view of one embodiment of the optical system making use of the phase type Fresnel zone plate according to the invention.
Figures 3, 3A:
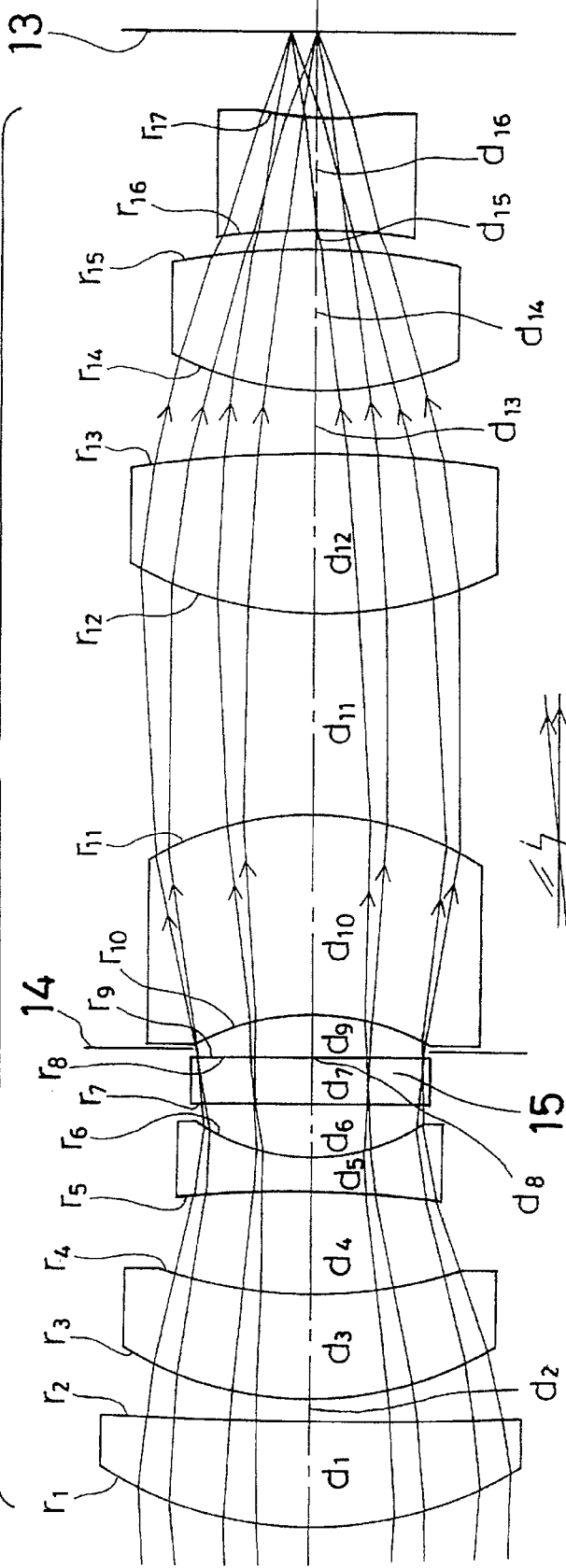
FIG. 3 is an enlarged view of a portion shown at FIG. 2.
FIG. 3A is an enlarged view of the surface of phase-type Fresnel zone plate 15.

FIG. 2 is a sectional view of one embodiment of the optical system making use of the phase type Fresnel zone plate according to this invention, and FIG. 3 is an enlarged view of an arrangement shown at 11 in FIG. 2. FIG. 3A is an enlarged view of the surface of the phase-type Fresnel zone plate 15 shown in FIG. 3. Throughout FIGS. 2 and 3, reference numeral 11 represents a projection lens with demagnification built in a stepping projection aligner using a KrF excimer laser as a light source, and 10 stands for an illuminator incorporated in the aligner body. Likewise, 12 represents a reticle placed on an object surface; 13 a wafer placed on an image surface; 14 an aperture diaphragm placed at the pupil location of the projection lens 11; and 15 a phase type Fresnel zone plate incoroporated in the projection lens 11. It is noted that part of the phase type Fresnel zone plate 15 schematically illustrated on an enlarged scale in FIG. 3. This part defines the boundary between the zones C and P.

The illuminating optical system 10 emits light with a central wavelength of 248.38 nm and a single band of wavelengths of light (width) of 0.35 nm (248.19–248.54 nm) and illuminates the reticle 12 from behind with uniform illuminance. Then; the projection lens 11 operates to project a pattern drawn on the reticle 12 on the wafer 13 on a scale of 1 to 5. The projection lens 11 has a numerical aperture, NA, of 0.35 and an exposure region of $\phi 2$ mm on the wafer 13, and the distance between the reticle 12 and the first surface of the projection lens 11 is 186.0383 mm. Other data of the projection lens 11 are set out in Table 1, and its aberration diagrams are provided in FIGS. 4A through 4E. In Table 1, it is noted that $r_i$ represents the radius of curvature of the surface of an i-th lens counted in order from the object side and $d_i$ stands for the thickness of an i-th lens counted order from the object side and the air gap. The optical material used is synthetic quartz, the refractive indices of which are set out in Table 2.

TABLE 1

| Radius of Curvature | Thickness · Air Gap | Vitreous Material |
|---|---|---|
| $r_1 = 30.4054$ | $d_1 = 8.0000$ | Synthetic Quartz |
| $r_2 = 355.8106$ | $d_2 = 1.6000$ | |
| $r_3 = 28.7353$ | $d_3 = 8.0000$ | Synthetic Quartz |
| $r_4 = 40.6480$ | $d_4 = 7.7000$ | |
| $r_5 = -97.0751$ | $d_5 = 2.6000$ | Synthetic Quartz |

TABLE 1-continued

| Radius of Curvature | Thickness · Air Gap | Vitreous Material |
|---|---|---|
| $r_6 = 15.3467$ | $d_6 = 4.3000$ | |
| $r_7 \infty$ | $d_7 = 3.7000$ | Synthetic Quartz |
| $r_8 \infty$ | $d_8 = 0.0000$ | ** |
| $r_9 = *$ | $d_9 = 3.2000$ | |
| $r_{10} = -17.7780$ | $d_{10} = 15.2000$ | Synthetic Quartz |
| $r_{11} = -23.6230$ | $d_{11} = 15.4000$ | |
| $r_{12} = 31.7739$ | $d_{12} = 12.0000$ | Synthetic Quartz |
| $r_{13} = -90.9941$ | $d_{13} = 5.1000$ | |
| $r_{14} = 26.0485$ | $d_{14} = 10.6000$ | Synthetic Quartz |
| $r_{15} = -58.4030$ | $d_{15} = 1.6000$ | |
| $r_{16} = -35.7916$ | $d_{16} = 8.5000$ | Synthetic Quartz |
| $r_{17} = 38.9539$ | | |

TABLE 2

| | Refractive Index | |
|---|---|---|
| Wavelength | Synthetic Quartz | ** |
| 248.38 nm | 1.508338 | 10001 |
| 248.19 nm | 1.508444 | 9993.35 |
| 248.54 nm | 1.508249 | 10007.44 |

In Table 1, an asterisk (*) put on the 9th surface indicates that it is in aspherical configuration. This aspherical surface is given by $$Z = (\tfrac{1}{2}) \times 1.567779 \times 10^{-6} x s^2 \text{(mm)}. \tag{3}$$

Here Z is the optical axis and s is the distance from the optical axis.

Two asterisks (**) put on the vitreous material of the 8th surface shows that it is formed of an imaginary vitreous material having an index of refraction as referred to in Table 2, whereby the 9th surface is allowed to serve a function equivalent to that of the phase type Fresnel zone plate. In other words, a refracting optical system formed of an optical material having a very high refractive index can be replaced by the phase type Fresnel zone plate.

This is discussed in an article by W. C. Sweatt, "J. Opt. Soc. Am.", Vol. 69, No. 3, March 1979, as summarized below.

Now letting $\theta$ and $\theta'$ denote the angles of incidence and exit of a ray, then the diffraction equation for a diffraction grating holds as such for the refraction of the ray by a phase type Fresnel zone plate. Thus, the following equation (4) holds:

$$\sin\theta - \sin\theta' = m\lambda/p. \tag{4}$$

Here m is the order of diffraction, $\lambda$ the wavelength of the ray and p is the Fresnel pitch.

On the other hand, letting n, t and s denote the refractive index of the refracting optical system, the thickness of the portion through which the ray passes and the distance from the optical axis, respectively and if $n \to \infty$ and $t \to 0$, then the following equation (5) can be deduced from the Snell's equation:

$$\sin\theta - \sin\theta' \to (n-1) dt/ds. \tag{5}$$

A comparison of the above-described two equations (4) and (5) teaches that if the refractive index n is large enough, then the following equation holds (6):

$$m\lambda/p = (n-1) dt/ds. \tag{6}$$

This equation (6) enables the refracting optical system to be replaced by a phase type Fresnel zone plate.

Then, the wavelength dispersion of the refractive index in the replacement of such a refracting optical system by the phase type Fresnel zone plate is found. Differentiating Equation (6) with respect to $\lambda$ gives $$\begin{aligned} m/p &= (dt/ds)(\partial n/\partial \lambda) \\ &= m\lambda/\{(n-1)p\} \cdot (\partial n/\partial \lambda) \end{aligned} \tag{7}$$

$$\Delta n = \{(n-1)/\lambda\}\Delta\lambda \text{ on condition that } m = 1.$$

In the instant embodiment, the refractive index of the imaginary vitreous material at the central wavelength of 248.38 nm was set at 10001 to replace the refracting optical system by the phase type Fresnel zone plate, and the values shown in Table 1 for other wavelengths were calculated by Equation (7). In the instant embodiment, therefore, the 7th and 8th surfaces correspond to the substrate of the phase type Fresnel zone plate 15 and the 9th surface to the phase Fresnel zone plate. In addition, it is equivalent to the refracting optical system in function including wavelength dispersion characteristics.

In this context, it is noted that synthetic quartz and other optical materials more or less increase in their indices of refraction as wavelengths decrease. By contrast, this imaginary vitreous material decreases in the index of refraction; that is, its wavelength dispersion is reverse to the optical materials in terms of sign. Thus, if the phase type Fresnel zone plate is used in combination with a general refracting optical system, then it could have a superb effect on correction of chromatic aberration.

Usually and in view of a transmittance problem, such lenses for stepping projection aligners, in which synthetic quartz is used for all optical materials, are not corrected for chromatic aberration. It is thus required to make some modification to the light sources, thereby limiting wavelength widths to a band as narrow as ±0.01 nm or less. In the instant embodiment, however, the projection lens 11 is provided in with the phase type Fresnel zone plate 15, which serves well enough to correct chromatic aberration, as can be best seen from FIG. 4. Even with light having a wavelength width of 0.35 nm as mentioned above, it is thus possible to project a pattern image of the reticle 12 on the wafer 13.

Table 3 shows the pitch of the phase type Fresnel zone plate, which was found as follows. Since by Equation (3) it can be shown that $dZ/ds=1.567779\times10^{-6}xs$ and it is obvious that $dZ=dt$, $dt/ds=dZ/ds=1.567779\times10^{-6}xs$. Subsituting this for Equation (6) gives $$\begin{aligned} p &= m \times \lambda/\{(n-1) dt/ds\} \\ &= m \times (0.24838 \text{ μm})/\{(10001-1) \times 1.567779 \times 10^{-6} s\} \end{aligned} \tag{8}$$

$$p = m \times 15.84279 \text{ (mm · μm)}/s \text{ (mm)}.$$

The pitch of the phase type Fresnel zone plate can be calculated by this Equation (8).

So far, a phase type Fresnel zone plate has been designed to make use of the same order of diffracted light all over the surface, and that order of diffracted light has been as low as 1 or 2 so as to achieve good diffraction efficiency. If a phase type Fresnel zone plate designed to make use of the second order of diffracted light all over the surface is applied to the instant embodiment, then its Fresnel pitch of the outermost periphery of the zone plate, i.e., at s=8.75 mm would be found to be 3.62 μm by Equation (8). Such is too fine to produce the plate.

This problem, however, can be solved by the present invention. The illuminator 10 illuminates the reticle 12 at an NA of 0.035. All light transmitting through the reticle 12 without being diffracted (the zero-order of diffracted light) passes through a central round region of φ8.8 mm (s=4.4 mm) of the phase type Fresnel zone plate. In the instant embodiment, the φ9 mm (s=4.5 mm) central region of the phase type Fresnel zone plate is called the central zone C and the peripheral outer region the zone P, as has already been, noted. As shown in Table 3, the zones C and P were so designed to make use of the m=2 and m=4 order of diffracted light, respectively, that their minimum pitches could each be set at about 7 μm that is not difficult to make. It is preferred that the peripheral order of the zone P be an integer close to the value found by (the order of central zone C)×(the outer diameter of peripheral zone P)/(the outer diameter of central zone C).

This renders it unnecessary to make the order of the peripheral zone P higher than needed—resulting in a drop of diffraction efficiency, or to make the order of the peripheral zone P too low to make plate production unfeasible; that is, diffraction efficiency is well balanced against the ease with which plate production can be practiced.

It is noted that the diffraction grating pattern engraved on the phase type Fresnel zone plate 15 is blazed so as to transmit the respective order of light. In other words, it is of saw-toothed configuration in section, as can be best seen from FIG. 3A representing part of the phase type Fresnel zone plate 15 on an enlarged scale, with the depth of the trough with respect to the peak conforming to the following equation:

$$m\lambda/(n-1)$$

Here n is the refractive index of the substrate of the phase type Fresnel zone plate 15. In the instant embodiment, n=1.508338, because synthetic quartz is used.

TABLE 3

| Zone | Order (m) | s (mm) | Pitch (μm) |
|------|-----------|--------|------------|
|      |           | 2      | 15.843     |
| C    | 2         | 4      | 7.921      |
|      |           | 4.5    | 7.041      |
|      |           | 4.5    | 14.082     |
| P    | 4         | 6      | 10.562     |
|      |           | 8.74   | 7.251      |

As described above, the present invention enables the pitch of the peripheral region of a phase type Fresnel zone plate—which has heretofore been so fine that a serious problem arises in connection with production and design—to be improved with no substantial degradation of an image contrast, whereby the degree of freedom in designing the phase type Fresnel zone plate is so increased that higher-performance lenses can be designed and produced, using the phase type Fresnel zone plate. FIG. 5 depicts the pitch variation of the Fresnel zone plate according to the present invention.

What is claimed is:

1. A projection optical system comprising:
   an illumination device emitting a single band of wavelengths of light;
   an object illuminated by said single band of wavelengths of light and generating diffracted light therefrom;
   a projection lens system for projecting an image of said object at a given position, said projection lens system including:
   a phase type Fresnel zone plate;
   said phase type Fresnel zone plate including a Fresnel patterned surface having a plurality of areas, said plurality of areas including:
      a first area where 0-th order light of said diffracted light generated by said object passes, and
      a second area where 0-th order light of said diffracted light generated by said object does not pass;
   said Fresnel patterned surface being blazed such that a diffraction efficiency of said phase type Fresnel zone plate reaches a maximum with respect to a first given order of light diffracted in said first area; and
   said Fresnel patterned surface being blazed such that said diffraction efficiency of said phase type Fresnel zone plate reaches a maximum with respect to a second given order of light diffracted in said second area, said second given order being different from said first given order.

2. A projection optical system according to claim 1, wherein said projection lens system further comprises:
   a pupil;
   said phase type Fresnel zone plate being disposed one of at and near said pupil.

3. A projection optical system according to claim 1, wherein:
   said illumination device includes an excimer laser as a light source.

4. A projection optical system according to claim 1, wherein:
   said first area of said Fresnel patterned surface is a central area of said phase type Fresnel zone plate and includes an optical axis of said projection optical system; and
   said second area of said Fresnel patterned surface is an annular area of said phase type Fresnel zone plate enclosing said central area of said phase type Fresnel zone plate.

5. A projection optical system according to claim 1, wherein said projection lens system further includes, in order from an object side:
   an object side lens unit; and
   an image side lens unit;
   said phase type Fresnel zone plate being disposed between said object side lens unit and said image side lens unit.

6. A projection optical system according to claim 1, wherein:
   said second given order of light diffracted in said second area is a higher order than said first given order of said light diffracted in said first area.

7. A projection optical system according to claim 6, wherein:
   said first area of said Fresnel patterned surface is a central area of said phase type Fresnel zone plate and includes an optical axis of said projection optical system; and
   said second area of said Fresnel patterned surface is an annular area of said phase type Fresnel zone plate enclosing said central area of said phase type Fresnel zone plate.

8. A projection optical system according to claim 1, wherein:
   said illumination device produces substantially coherent light.

9. A projection optical system according to claim 8, wherein:
   said light from said illumination device has a wavelength width of substantially more than 0.02 nm and less than or equal to 0.35 nm.

10. A Fresnel zone plate comprising:

a Fresnel patterned surface having a plurality of areas, said plurality of areas including:
  a first area where 0-th order light of a single wavelength of diffracted light generated by an object passes, and
  a second area where said 0-th order light of said single wavelength of said diffracted light generated by said object does not pass;

said Fresnel patterned surface being blazed such that a diffraction efficiency of said phase type Fresnel zone plate reaches a maximum with respect to a first given order of said single wavelength of said diffracted light generated by said object in said first area; and said Fresnel patterned surface being blazed such that said diffraction efficiency of said Fresnel zone plate reaches a maximum with respect to a second given order of said single wavelength of said diffracted light generated by said object in said second area, said second given order being different from said first given order.

11. A Fresnel zone plate comprising:

a Fresnel patterned surface having a plurality of zones, said plurality of zones including:
  a first zone provided at a position where 0-th order light of light diffracted by an object passes, and
  a plurality of second zones provided at positions where said 0-th order light diffracted by said object does not pass;

said Fresnel patterned surface being blazed such that a pitch of gratings formed thereon decreases from an optical axis toward a first zonal boundary, is increased past said first zonal boundary from said optical axis, and decreases again from past said first zonal boundary towards a second zonal boundary from said optical axis.

12. A projection optical system comprising:

an illumination device emitting a single band of wavelength of light;

an object illuminated by said single band of wavelengths of light and generating diffracted light therefrom; and a projection lens system including a Fresnel zone plate, said Fresnel zone plate comprising:
  a Fresnel patterned surface having a plurality of areas, said plurality of areas including:
    a first area where 0-th order light of said diffracted light passes, and
    a second area where said 0-th order light of said diffracted light does not pass;
  said Fresnel patterned surface being blazed such that a diffraction efficiency of said Fresnel zone plate reaches a maximum with respect to a first given order of light diffracted in said first area; and
  said Fresnel patterned surface being blazed such that said diffraction efficiency of said Fresnel zone plate reaches a maximum with respect to a second given order of light diffracted in said second area, said second given order being different from said first given order.

13. A projection optical system comprising:

an illumination device emitting a single band of wavelength of light;

an object illuminated by said single band of wavelengths of light and generating diffracted light therefrom; and a projection lens system including a Fresnel zone plate, said Fresnel zone plate comprising:
  a Fresnel patterned surface having a plurality of zones, said plurality of zones including:
    a first zone provided at a position where 0-th order light of said diffracted light passes, and
    a plurality of second zones provided at positions where said 0-th order light of said diffracted light does not pass;
  said Fresnel patterned surface being blazed such that a pitch of gratings formed thereon decreases from an optical axis toward a first zonal boundary, is increased past said first zonal boundary from said optical axis, and decreases again from past said first zonal boundary towards a second zonal boundary from said optical axis.

* * * * *